United States Patent [19]
Mausgrover et al.

[11] Patent Number: 5,433,927
[45] Date of Patent: Jul. 18, 1995

[54] OZONE GENERATOR HAVING A CONDUCTOR WITH PROJECTIONS EXTENDING THROUGH AN INNER ELECTRODE AND ASSOCIATED FABRICATION METHOD

[75] Inventors: Robert H. Mausgrover; Dennis H. McEachern, both of Concord, N.C.

[73] Assignee: Figgie International, Willoughby, Ohio

[21] Appl. No.: 48,487

[22] Filed: Apr. 16, 1993

Related U.S. Application Data

[63] Continuation-in-part of Ser. No. 832,989, Feb. 10, 1992.

[51] Int. Cl.6 .............................................. C01B 13/11
[52] U.S. Cl. ........................... 422/186.07; 422/186.18; 422/907
[58] Field of Search ....................... 422/186.07, 186.18, 422/907

[56] References Cited

U.S. PATENT DOCUMENTS

| | | | |
|---|---|---|---|
| Re. 34,571 | 3/1990 | Uys | 422/186.07 |
| 565,952 | 8/1896 | Andreoli | 422/186.07 |
| 788,557 | 5/1905 | Sahlstrom | 422/186.07 |
| 832,768 | 10/1906 | Bridge | 422/186.07 |
| 935,457 | 9/1909 | Bridge | 422/186.07 |
| 1,437,760 | 12/1922 | Kuhlenschmidt | 422/186.07 |
| 2,658,868 | 11/1953 | Collison | 422/186.07 |
| 2,937,983 | 5/1960 | Ryan | 204/193 |
| 3,023,155 | 3/1960 | Castor | 422/186.07 |
| 3,215,616 | 11/1965 | Spielman | 204/313 |
| 3,530,058 | 9/1970 | Blanchard | 204/320 |
| 3,671,417 | 6/1972 | Louboutin | 204/320 |
| 4,035,657 | 7/1977 | Carlson | 422/186.01 |
| 4,062,748 | 12/1977 | Imris | 204/176 |
| 4,090,960 | 5/1978 | Cooper | 210/748 |
| 4,213,838 | 7/1980 | Lowther | 204/176 |
| 4,214,995 | 7/1980 | Saylor | 422/186.18 |
| 4,293,775 | 10/1981 | Feverstake et al. | 250/535 |
| 4,351,734 | 9/1982 | Kauffman | 210/748 |
| 4,417,966 | 11/1983 | Krauss et al. | 204/176 |
| 4,614,573 | 9/1986 | Masuda | 204/176 |
| 4,877,588 | 10/1989 | Ditzler et al. | 422/186.19 |
| 5,009,858 | 4/1991 | Mechterscheimer | 422/186.19 |
| 5,034,198 | 7/1991 | Kaiga et al. | 422/186.07 |
| 5,348,709 | 9/1994 | Wheatley | 422/186.18 |
| 5,364,600 | 11/1994 | Stiehl et al. | 422/186.07 |

FOREIGN PATENT DOCUMENTS

| | | |
|---|---|---|
| 224861 | 8/1910 | Germany . |
| 2606731 | 1/1978 | Germany . |

*Primary Examiner*—Donald P. Walsh
*Assistant Examiner*—Daniel Jenkins
*Attorney, Agent, or Firm*—Bell, Seltzer, Park & Gibson

[57] ABSTRACT

An ozone generator includes an inner electrode formed of a mass of helical windings through which an elongate electrical conductor extends. The elongate conductor is preferably a metal strip having opposing rows of sawtooth projections extending outwardly from opposing side edges of the strip. The metal strip also preferably has a generally sinuous shape in longitudinal cross-section. An outer electrode is separated from the inner electrode by a dielectric tube. The inner and outer electrodes produce ozone gas using an electrical corona discharge in the presence of an oxygen containing gas. A second tube surrounds the first dielectric tube to capture ozone generated at the outer electrode. A pair of endcaps directs gas flow adjacent the outer conductor and through the inner conductor.

32 Claims, 3 Drawing Sheets

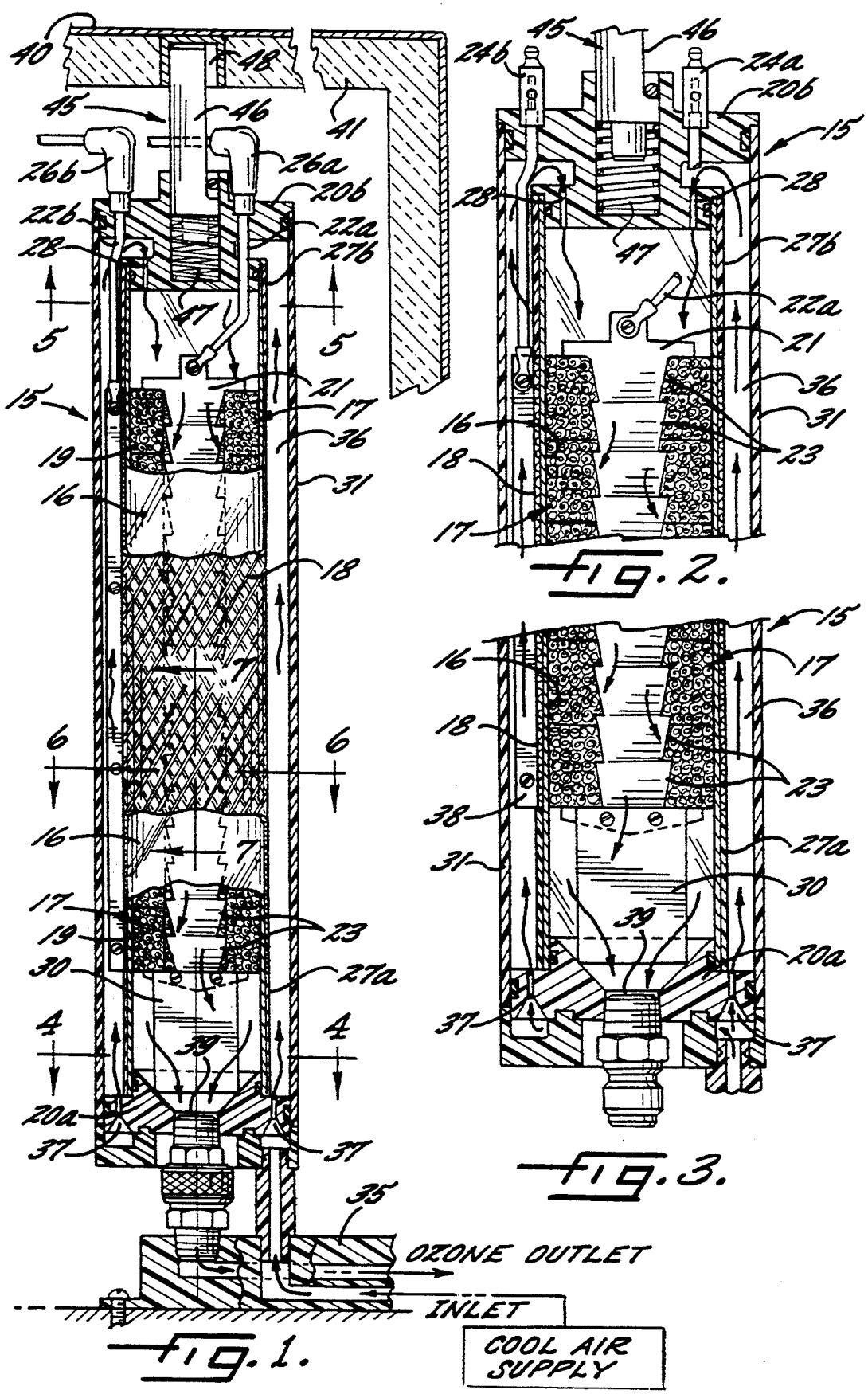

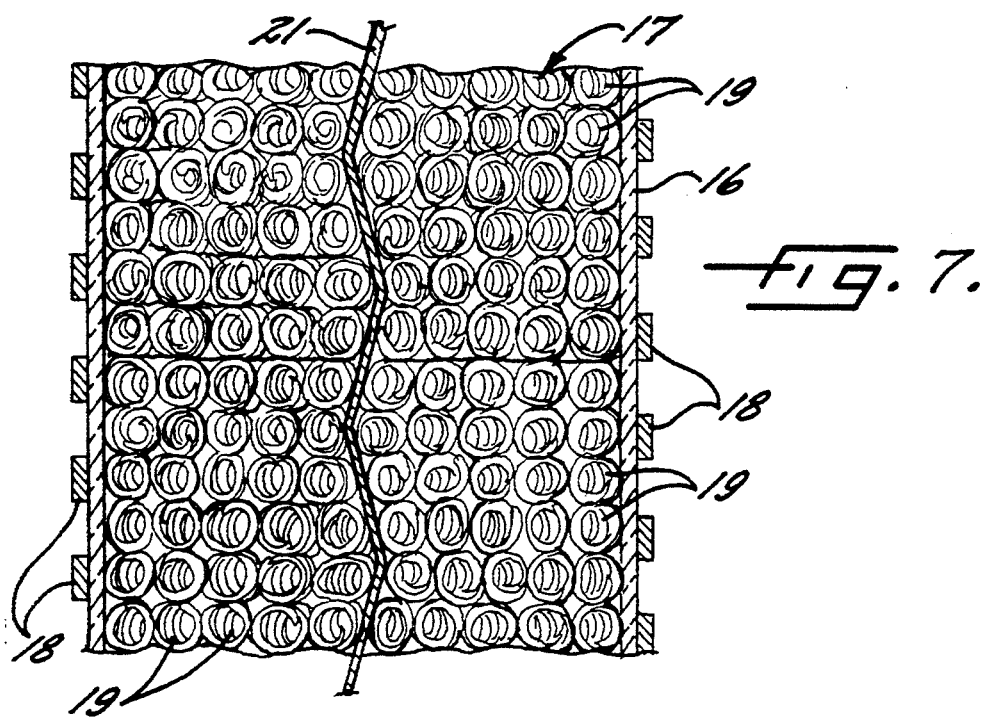
fig. 7.
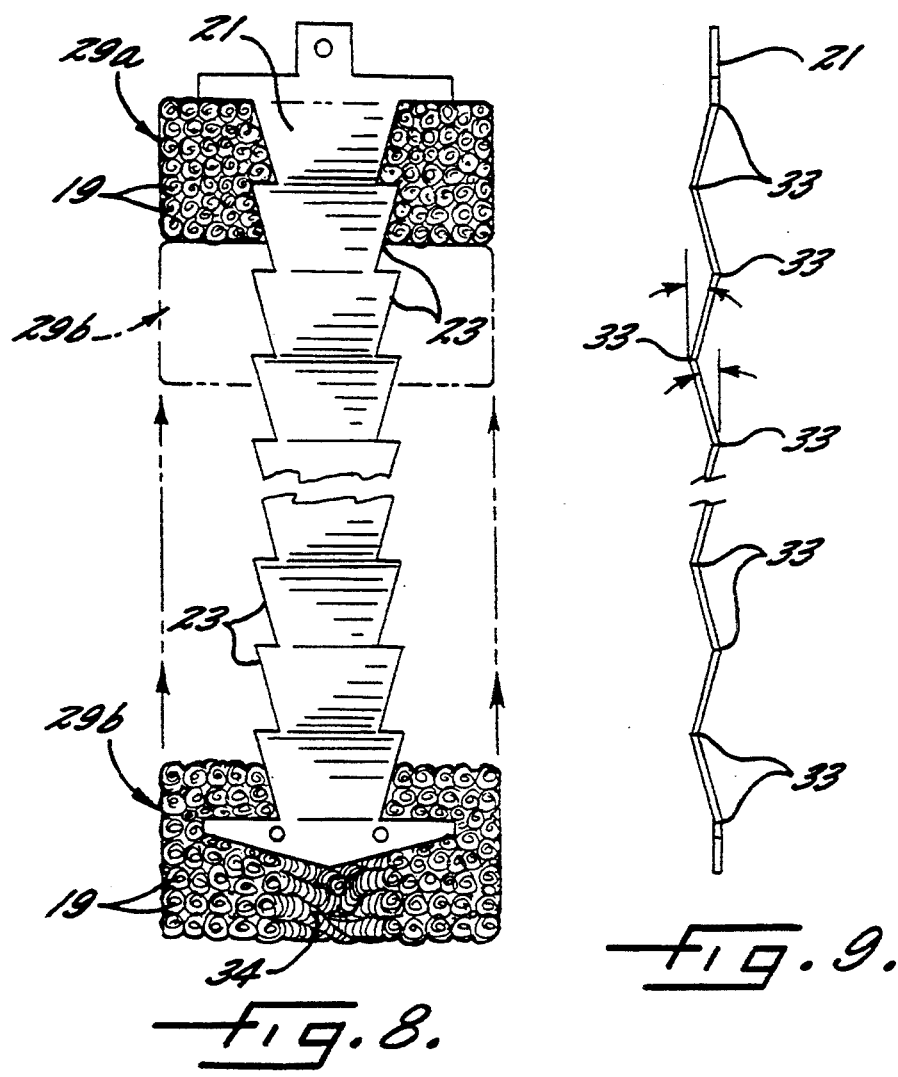
fig. 8.
fig. 9.

OZONE GENERATOR HAVING A CONDUCTOR WITH PROJECTIONS EXTENDING THROUGH AN INNER ELECTRODE AND ASSOCIATED FABRICATION METHOD

RELATED APPLICATIONS

This application is a continuation-in-part application of U.S. patent application Ser. No. 07/832,989, filed on Feb. 10, 1992.

FIELD OF THE INVENTION

This invention relates to the field of ozone generators, and more particularly, to an ozone generator for producing ozone gas from an electrical corona discharge and an associated method for making the generator.

BACKGROUND OF THE INVENTION

Ozone is one of the most powerful oxidizers and disinfectants available. Ozone not only kills bacteria, but also inactivates many viruses, cysts and spores. In addition, ozone oxidizes many organic chemical compounds, including chloramines, soaps, oils and other wastes thereby rendering them harmless to the environment. Accordingly, ozone may be used for a number of purposes including: drinking water purification, waste water treatment, air purification and sterilization, and a variety of medical uses.

Ozone is typically generated by one of two methods. Ultraviolet lamps operating at a wavelength of between 180–190 nanometers may be used to produce ozone in ambient air. Ozone may also be generated by creating an electrical corona discharge between two energized electrodes in ambient air or in another oxygen containing gas. The electrodes are typically separated by a dielectric material, such as a glass, or an air gap separation may be provided. The corona discharge is an ionization of the air and is visually indicated by the presence of a pale violet or bluish color in the area between and surrounding the electrodes.

Because ozone has a half-life of only about 22 minutes in ambient air before dissociating back to oxygen, a process requiring ozone must have an ozone generator in close proximity to the desired point of application of the ozone. Thus, an ideal ozone generator is desirably compact, relatively simple in construction, consumes little electricity, and produces little waste heat while producing a high concentration of ozone.

A number of ozone generators have been made or proposed based on the electrical corona discharge process for producing ozone. In particular, a wide assortment of electrode configurations have been developed to try to improve the performance of the basic corona discharge ozone generator. For example, an ozone generator electrode formed from a planar wire mesh or screen is disclosed in U.S. Pat. No. 2,658,868, to Collison, which discloses in a cylindrical ozone generator wherein both the inner and outer electrodes are preferably provided by concentrically disposed wire screens separated by a dielectric tube. Similarly, U.S. Pat. No. 4,035,657 to Carlson discloses an ozone generator having concentric electrodes formed from planar rectangular sheets of stainless steel wire mesh screen.

Two U.S. Pat. to Bridge, U.S. Pat. Nos. 832,768 and 935,457, disclose a cylindrical surface electrode having openings therein permitting the flow of a gas through and transverse to the electrode. The Bridge patents teach various electrode surface configurations including a perforated tubular shape, a rectangularly perforated shape, and a wire mesh. U.S. Pat. No. 788,557 to Sahlstrom discloses planar or concentrically positioned electrodes separated by a dielectric, and wherein the electrodes have either pointed raised portions or are formed of a wire gauze.

Ozone generator electrodes having raised portions on the electrode surface have been proposed. For example, Saylor discloses, in U.S. Pat. No. 4,214,995, an ozone generator having a plurality of electrode sets, each set having a dimpled inner electrode in a sealed dielectric and surrounded by an outer electrode spaced from the inner electrode to permit a flow of air therebetween. U.S. Pat. No. 4,062,748 to Imris discloses a bipolar grid shaped electrode wherein the bipolar and discharge electrodes have surfaces with sawtooth or needle-shaped points.

Smooth or flat electrode surfaces are disclosed, for example, in U.S. Pat. Nos. 4,213,838 and 4,090,960 to Lowther and Cooper, respectively. The Lowther patent discloses a corona reaction chamber for producing ozone, wherein excess heat is carried away from the system by a gas flow therethrough, and wherein the electrodes are closely spaced flat plates. The Cooper patent discloses an apparatus with two electrodes separated by a porous sheath filter whereby ozone generated from a tubular smooth inner electrode is passed through the sheath as it is formed and injected out into a flow of liquid.

"Filled" electrodes for ozone generation have also been proposed, wherein the electrode is formed of a mass of filling material. For example, Kuhlenschmidt, in U.S. Pat. No. 1,437,760, discloses an ozone generator having a concentric series of evacuated and sealed glass structures containing each electrode. Passageways between the glass structures permit fluid flow therethrough. The Kuhlenschmidt evacuated glass structure electrodes are filled with a material, such as loosely arranged metal chips, coarse metallic fillings and wire chips, interlacingly arranged pieces of wire gauze, or leaden shot having a spherical diameter of about one millimeter.

U.S. Pat. No. 4,351,734 to Kauffman discloses an ozone generator for treating a wastebearing liquid by passing air through an electrode bed in the liquid. The Kauffman electrode bed consists of two mesh grids with a packing of aluminum shot therebetween. Castor, in U.S. Pat. No. 3,023,155, discloses a cylindrical ozone generator having an inner electrode consisting of a tube with passages for the flow of air therethrough and further surrounded by a mass of aluminum granules preferably on the order of fifty to twenty-five thousandths of an inch in size. The aluminum particles of the Castor electrode are each insulated from one another by the formation of an oxide coating thereon.

Other approaches have been proposed to modify the basic electrical corona discharge and thereby achieve greater ozone conversion efficiency and/or greater energy consumption efficiency. For example, U.S. Pat. No. 4,417,966 to Krauss et al. discloses an ozone generator having a glow discharge chamber in which an electrode is located and in which a gas, such as neon, is ionized by an electric field that is produced by a voltage pulse at a frequency of from 10–16 KHz. Thus, in Krauss the entire glow discharge chamber functions as an inner plasma electrode and the outer electrode has a net-like form. Masuda discloses, in U.S. Pat. No. 4,614,573, an ozone generator which first compresses then cools the oxygen containing gas before passing it between a pair of electrodes—the inner electrode being formed of a series of linear electrodes on the inner surface of a cylindrical dielectric tube.

Unfortunately, despite the numerous beneficial applications for ozone, there still exists a need for an ozone generator that is relatively compact, rugged, reliable, readily manufactured, energy efficient, and which produces a high concentration of ozone.

SUMMARY OF THE INVENTION

It is therefore an object of the present invention to provide an ozone generator that is rugged and reliable, while being capable of efficiently producing a high concentration of ozone.

It is another object of the invention to provide a method for fabricating such an ozone generator.

These and other objects, features and advantages of the present invention are provided by an ozone generator including two electrodes separated by a dielectric tube, and wherein an inner electrode is positioned in the interior of the tube and through which passes an elongate electrical conductor having a plurality of outwardly extending projections. The inner electrode is preferably provided by a mass of helical windings with a series of curved surfaces of electrically conductive material for creating the electrical corona as described in copending application entitled *Ozone Generator Having an Electrode Formed of a Mass of Helical Windings and Associated Method*, Ser. No. 07/832,989, the entire disclosure of which is hereby incorporated herein by reference.

The mass of helical windings is preferably positioned in the interior of the dielectric tube underlying the outer electrode and substantially fills the interior cross-section of the dielectric tube. Thus, the outwardly extending projections engage the mass of helical windings to provide an electrical connection to the windings and to maintain the windings in an axially compacted state within the dielectric tube.

The outer electrode has an open lattice structure and overlies a portion of the dielectric tube. The outer electrode is preferably formed of a material, such as stainless steel, that is resistant to chemical breakdown in the presence of ozone. The open lattice structure further serves to distribute heat, and thereby prevent localized hot spots.

As would be readily understood by those skilled in the art, the corona discharge at the electrodes acts upon the oxygen molecules ($O_2$) to produce ozone ($O_3$). A compact high voltage electrical power supply for the electrodes may be provided, for example, by a commercially available neon light transformer. The transformer converts household power (120 VAC) to 9–12 KVAC to power the electrodes and create the electrical corona. Thus, ozone is produced when an oxygen containing gas, such as air, passes through the electrical corona discharge of the inner electrode. Ozone is also generated by the electrical corona at the outer electrode.

The mass of helical windings is preferably formed from at least one milled sponge with a plurality of layers of at least one continuous helical winding extending in a generally spiral direction about a central axis of the milled sponge. Stainless steel is a preferred material for the milled sponge, since stainless steel is an electrical conductor and is resistant to chemical attack from ozone. The radius of curvature of each of the helical windings is preferably not more than about one quarter of an inch.

The elongate electrical conductor extending through the inner electrode is preferably a metal strip with a pair of opposing rows of sawtooth-shaped projections extending from respective side edges of the strip. In addition, the strip preferably has a generally sinuous cross-sectional shape as defined by a series of spaced apart alternating bends. Thus, the sawtooth projections and sinuosity of the strip serve to hold a series of milled sponges on the strip with a predetermined degree of compaction and further serve to prevent settling of the sponges during shipping and operation. Also, enlarged opposite end portions are preferably provided at each end of the strip for confining the mass of helical windings. The strip further provides a convenient means for mounting the plurality of sponges within the dielectric tube, as described further with respect to a fabrication method according to the invention.

To capture the ozone generated at the outer electrode, a second tube preferably surrounds the first dielectric tube in a spaced apart relation therefrom. The two tubes define a passageway therebetween to capture ozone generated at the outer electrode on the exterior of the first dielectric tube. Endcap means, including first and second endcaps, is connected to the ends of the first and second tubes to direct the gas flow through the tubes. First, an oxygen containing gas flows through a first endcap and into the passageway between the first and second tubes. A second endcap directs the flow from the passageway and through the interior of the first dielectric tube. Accordingly, ozone containing gas exits the interior of the dielectric tube again through the first endcap.

In a preferred embodiment, an insulated housing is provided to accommodate one or more ozone generators. The insulated housing permits chilled air to be fed to the ozone generators, thereby enhancing ozone production efficiency. To facilitate positioning of the generator within the housing, the second endcap of the ozone generator preferably includes plunger means cooperating with a recess in the housing for permitting the generator to be readily positioned within the housing and easily removed, if desired.

The method for making the ozone generator according to the invention includes providing a series of milled sponges and an elongate conductor as described above, and successively positioning each of the milled sponges onto the elongate conductor. More particularly, since the sponges are stretchable, each sponge is stretched outwardly from its central axis to create an opening which may then be positioned onto the elongate conductor. The sponge will return to its approximate original shape thereby firmly seating itself on the projections of the elongate conductor.

While positioning the sponges onto the elongate conductor, each sponge is preferably compacted a predetermined amount in an axial direction. This compacted arrangement prevents settling of the sponges during shipping and operation, and, moreover, provides a desired density of the overall mass of helical windings provided by the milled sponges. In addition, the assembly including the elongate conductor and the series of sponges mounted thereon, may be readily positioned as an entity into the interior of the dielectric tube, thereby simplifying fabrication of the ozone generator.

An outer electrode is positioned surrounding the dielectric tube. Thus, a second concentric tube may be positioned surrounding the outer electrode to collect ozone generated at the outer electrode.

BRIEF DESCRIPTION OF THE DRAWINGS

FIG. 1 is a fragmentary front view, partially in section, of an ozone generator according to the present invention.

FIG. 2 is an enlarged fragmentary front view, partially in section, of an upper end portion of the ozone generator as shown in FIG. 1.

FIG. 3 is an enlarged fragmentary front view, partially in section, of a lower end portion of the ozone generator as shown in FIG. 1.

FIG. 7 is a greatly enlarged cross-sectional view of a portion of the ozone generator taken along lines 7—7 in FIG. 1 with the outer dielectric tube removed for clarity.

FIG. 8 is an enlarged cross-sectional view of the milled sponges being placed on the elongate conductor during fabrication of the ozone generator according to a method of the present invention.

FIG. 9 is a side elevational view of the elongate conductor of the ozone generator according to the invention.

DETAILED DESCRIPTION OF THE PREFERRED EMBODIMENTS

Figure 4:
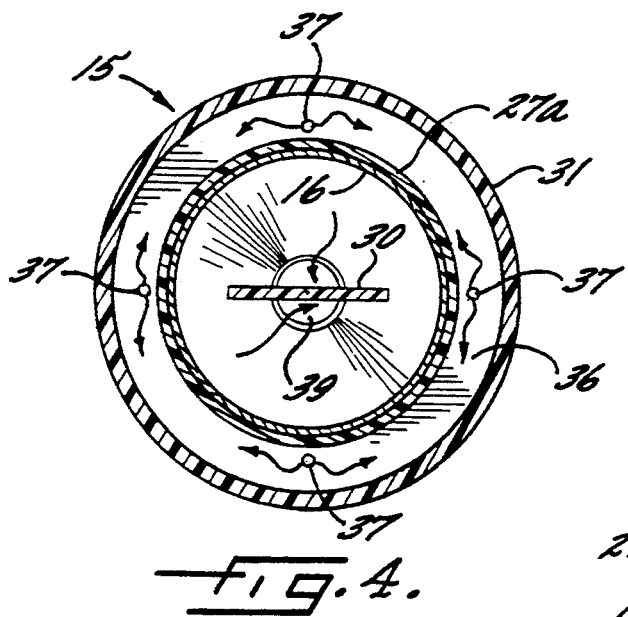
FIG. 4 is a cross-sectional view of the ozone generator taken along lines 4—4 in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art.

Referring first to FIGS. 1-3, there is shown an embodiment of an ozone generator according to the present invention generally designated by reference numeral 15. The ozone generator 15 includes a first dielectric tube 16 that separates an inner electrode 17 and an outer electrode 18. The first dielectric tube 16 is preferably borosilicate glass, which is commonly available under the trademark PYREX ®. The borosilicate glass has a high dielectric strength and is resistant to pinholing damage caused by the strong electric fields created between the inner electrode 17 and the outer electrode 18 when the electrodes are powered.

The first dielectric tube 16 may typically have about a 3.4 inch diameter and have a length of about 20 to 40 inches. As would be readily understood by those skilled in the art, the dimensions of the ozone generator 15 according to the invention may be varied depending on the quantity of ozone production required. In the illustrated embodiment, the first dielectric tube 16 is shown as a cylinder having a circular cross-section; however, it would be readily understood to those having skill in the art that the tube 16 may have other cross-sectional shapes as well. As also understood to those skilled in the art, the inner electrode 17 and outer electrode be may be connected to a high voltage electrical power supply (not shown), such as a conventional neon light transformer. The transformer converts 120 VAC power into 9-12 KVAC to power the electrodes 17, 18 and create the electrical corona.

Referring now additionally to the greatly enlarged view of FIG. 7, the inner electrode 17 is provided by a mass of helical windings 19 positioned in the interior of the first dielectric tube 16 underlying the outer electrode 18. In the illustrated embodiment, the mass of helical windings 19 substantially fills the cross-sectional dimension of the first dielectric tube 16. The helical windings 19 in the mass thereof may be arranged in a somewhat regular arrangement, as illustrated, or the helical windings may be more randomly arranged, as long as the arrangement facilitates the intermixing of an oxygen containing gas passing through the helical windings of the inner electrode 17. The intermixing of the gas passing through the inner electrode 17 is theorized by applicants without there wishing to be bound thereto, to enhance the formation of ozone while carrying away any waste heat generated by the corona. Thus, the energy efficiency and ozone production rate are enhanced.

The helical windings 19 are preferably helically wound strips of electrically conductive material, such as stainless steel, which is resistant to chemical attack from ozone. The mass of helical windings 19 forming the inner electrode 17 may preferably be provided by one or more milled sponges 29a, 29b (FIG. 8) of electrically conductive material. Each milled sponge has a plurality of layers of at least one continuous helical winding 19 extending in a generally spiral direction about a central axis of the milled sponge.

The radius of curvature of the helical windings 19 is preferably in the range of about one-sixteenth to one-eighth of an inch, and preferably no more than about one-quarter of an inch. Several of the milled sponges 29a, 29b may be successively packed into the dielectric tube 16 as described below with respect to a method aspect of the invention. It is theorized without applicants wishing to be bound thereto, that the helical windings 19 of the inner electrode 17 with the series of curved surfaces thereon, have greater ionization efficiency than prior art electrodes because the electrical corona is also generated from a large number of points extending into the interior of the mass of helical windings, rather than being confined strictly to an outer surface portion as in typical prior art ozone generators.

Referring now additionally to FIGS. 8 and 9, the inner electrode 17 may preferably include an elongate conductor having a plurality of outwardly extending projections thereon. In the illustrated embodiment, the elongate conductor is an electrically conductive metal strip 21 extending lengthwise through the mass of helical windings 19 of the inner electrode.

The metal strip 21 in the illustrated embodiment includes opposing rows of sawtooth projections 23 extending outwardly from opposing side edges of the metal strip. The metal strip 21 is preferably positioned along the axis of the dielectric tube 16 and in contact with adjacent portions of the mass of helical windings 19 of the milled sponges 29a, 29b to thereby support the sponges within the dielectric tube 16, while also efficiently distributing electrical current along the full extent of the inner electrode 17.

The metal strip 21 also has a generally sinuous longitudinal cross-section defined by a series of spaced apart bends 33 in alternating directions and at predetermined angles as shown in FIG. 9. The predetermined angle of the bends 33 as indicated is preferably about 15°. The alternating bends 33 further enhance electrical conductivity by providing more area over which power can be distributed within the mass of helical windings 19. The bends 33 also provide additional contact with and support for the adjacent portions of the mass of helical windings 19. As would be readily understood by those skilled in the art, other shapes of projections 23, and other longitudinal cross-sectional shapes of the elongate electrical conductor are also contemplated by the invention.

The metal strip 21 is connected by a suitable high voltage insulated conductor 22a to an exterior binding post 24a (FIG. 2), which, in turn, is preferably connected to a high voltage wire 26a extending from a high voltage electrical power supply, not shown. The metal strip 21 may be secured within the dielectric tube 16 by an insulating spacer strip 30 as illustrated (FIGS. 1 and 3).

Figure 6:
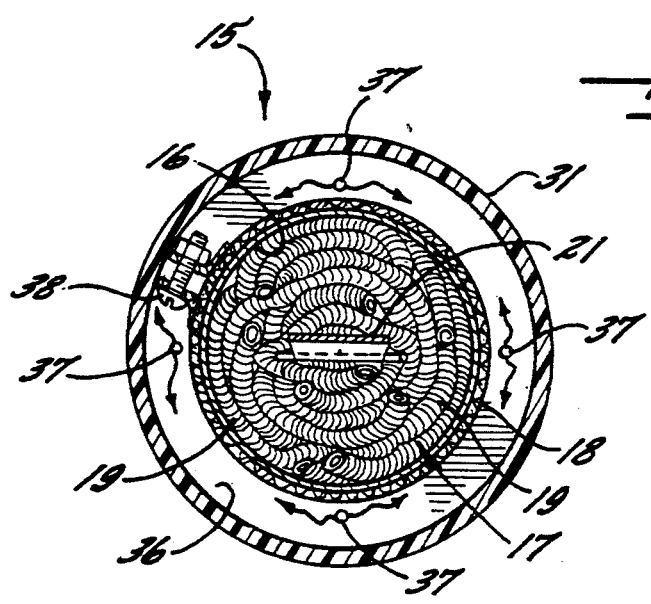
FIG. 6 is a cross-sectional view of the ozone generator taken along lines 6—6 in FIG. 1.

The outer electrode be (FIGS. 1, 6 and 7) is preferably an open lattice structure formed from an expanded metal sheet which is secured in a cylindrical shape with a clamp 38 surrounding the dielectric tube 16. The outer electrode be is also connected to a high voltage wire 22b, in turn, connected to a binding post 24b. The binding post 24b may be connected to the high voltage power source by a wire 26b.

The outer electrode be may preferably be stainless steel which is resistant to chemical attack from ozone. Also, the outer electrode 18 is held in place by a pair of spacer collars 27a, 27b at opposing ends of the dielectric tube 16 (FIGS. 2 and 3). The spacer collars 27a, 27b may be sections of chlorinated polyvinyl chloride (PVC) tubing which is resistant to chemical attack from ozone.

In the illustrated embodiment, a second or outer tube 31 is preferably positioned in spaced apart relation from the first or inner dielectric tube 16 to thereby define a gas flow passageway 36 between the two tubes. Thus, the passageway 36 captures ozone generated at the outer electrode be. Because of the high voltage carried by the outer electrode 18, the outer tube 31 is also preferably formed of a dielectric material.

Referring now particularly to FIGS. 2-5, end cap means for the generator 15 is explained. The end cap means is preferably provided by respective lower and upper end caps 20a, 20b at the opposing respective lower and upper open ends of the tubes 16, 31. The end caps 20a, 20b facilitate the flow of gas into, within, and out of the ozone generator 15. In the illustrated embodiment, a gas manifold 35 is connected to the lower endcap 20a and permits the inflow of an oxygen containing gas, such as air, through inlet apertures 37 of the lower endcap 20a and into the passageway 36 between the first and second dielectric tubes 16, 31, as shown in FIG. 4.

Figure 5:
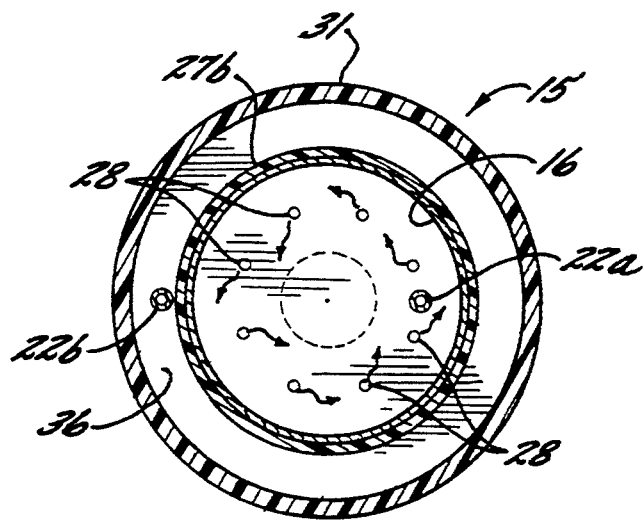
FIG. 5 is a cross-sectional view of the ozone generator taken along lines 5—5 in FIG. 1.

As shown in FIG. 5, the passageway 36 is in communication with the interior of the first dielectric tube 16 by way of intermediate apertures 28 in the upper endcap 20b. The ozone generated at the outer electrode 18 can thus be captured and combined with the ozone generate at the inner electrode 17. The ozone is directed out of the inner dielectric tube 16 through an outlet aperture 39 (FIG. 4). The outlet aperture in turn, is connected in fluid communication with the manifold 35 (FIG. 1).

As would be readily appreciated by those skilled in the art, the direction of gas flow through the tubes 16, 31 of the ozone generator 15 may be reversed from the flow direction of the illustrated embodiment. As would also be readily understood by those skilled in the art, the flow of gas through the ozone generator 15 may be achieved by applying positive pressure to the inlet apertures 37, negative pressure at the outlet aperture 35, or a combination of both. Accordingly, a blower, not shown, may be coupled to the inlet apertures 37 of the ozone generator 15, or the outlet aperture 35 may be coupled to a venturi, not shown, for delivering the ozone gas into a liquid, such as for the treatment of water.

Referring again more particularly to FIG. 1, there is shown a housing 40 containing the manifold and the ozone generator 15. The housing 40 includes an inner layer of insulation 41 for applications where cool air is delivered as the oxygen containing gas to the ozone generator 15. In a typical application, several ozone generators 15 may be contained within the single housing 40, and, accordingly, their respective inlet apertures 37 may be fed from the surrounding cold air within the housing without requiring the use of an inlet manifold.

The housing 40 also serves to protect personnel from the relatively high electrical voltage of the ozone generator 15. The ozone generator 15 also preferably includes plunger means 45 carried by the upper endcap 20b so that the generator is readily installed or removed from the housing. The plunger means preferably includes a keyed shaft 46 outwardly biased by a spring 47. The keyed shaft 46 includes an end portion extending into a corresponding recess 48 in the housing 40, as in the illustrated embodiment. Thus, a generator 15 may be readily tested or replaced. In addition, the housing 40 may include several spare generator positions, which can be filled, such as when the demand for ozone increase.

It has been found that maintaining the temperature of the ozone gas at the outlet aperture 35 of the ozone generator 15 below about 80° F. increases ozone yield, since high temperatures may cause dissociation of ozone back into oxygen. The temperature of the oxygen containing gas within the housing 40 and/or at the inlet apertures 37 may thus be preferably maintained below about 50° F., and more preferably in the range of 30-40° as may be readily achieved with conventional cooling means, such as thermoelectric coolers. In addition, the relative humidity may also desirably be maintained below about 25% to achieve greater efficiency for the ozone generator 15.

Referring now again to FIG. 8, a method aspect of the present invention is explained. The method for making the ozone generator 15 according to the invention includes providing a series of milled sponges 29a, 29b and the metal strip 21 or other elongate electrical conductor as described above, and successively positioning each of the milled sponges onto the strip 21. More particularly, since the sponges are stretchable, each sponge is stretched outwardly from its central axis to create an opening 34 which may then be positioned onto the strip 21. The sponge will return to its approximate original shape thereby firmly seating itself on the projections 23 of the strip 21.

While positioning the sponges 29a, 29b onto the strip 21, each sponge is preferably compacted a predetermined amount in an axial direction. For example, each sponge may be compacted to about 70% of its noncompacted axial dimension. This compacted arrangement prevents settling of the sponges during shipping and operation, and, moreover, provides a desired density of the overall the mass of helical windings 19 provided by the milled sponges. In addition, the assembly including the metal strip 21 and the series of sponges 29a, 29b mounted thereon, may be readily positioned as an entity into the interior of the dielectric tube 16, thereby simplifying fabrication of the ozone generator 15.

As shown in FIG. 8, after a first sponge 29a has been placed in its final position on the metal strip 21, a second sponge 29b is stretched and positioned over the other end of the metal strip and is ready to be moved axially with the "grain" of the outwardly extending sawtooth projections 23 placed in it final position adjacent the first sponge 29a. As can be readily appreciated from the illustrated embodiment, the orientation of the sawtooth projections 23 in a common canted direction establishes a preferred longitudinal direction of sponge placement, and also serves to hold each sponge in a predetermined degree of compaction during the positioning of successive sponges. In other words, the arrangement and orientation of the sawtooth projections 23 serve as barbs for preventing unintended settling or movement of the sponges 29a, 29b. As also highlighted in FIG. 8, enlarged opposite end portions of the metal strip 21 further serve to ensure retention of the series of milled sponges in the predetermined degree of compaction.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for generating ozone from an oxygen containing gas using an electrical corona, said apparatus comprising:
    a first dielectric tube;
    an outer electrode overlying a portion of said first dielectric tube;
    an inner electrode positioned in an interior of said first dielectric tube and underlying said outer electrode for creating an electrical corona and thereby producing ozone from an oxygen containing gas passing through said inner electrode; and
    an elongate electrical conductor positioned in the interior of said first dielectric tube, said elongate electrical conductor having a plurality of outwardly extending projections in electrical contact with adjacent portions of said inner electrode wherein said inner electrode is formed of a mass of helical windings of electrically conductive material, and wherein said helical windings have a series of curved surfaces thereon for creating the electrical corona therefrom.

2. An apparatus according to claim 1 wherein said elongate electrical conductor comprises an electrically conductive strip, and wherein said plurality of outwardly extending projections comprise opposing rows of sawtooth-shaped projections extending outwardly from opposing side edges of said strip.

3. An apparatus according to claim 2 wherein said strip has a generally sinuous longitudinal cross-section defined by a series of spaced apart alternating bends.

4. An apparatus according to claim 2 wherein said strip has enlarged opposite end portions for securing the mass of helical windings therebetween.

5. An apparatus according to claim 1 wherein said mass of helical windings substantially fills an interior cross-section of said first dielectric tube.

6. An apparatus according to claim 1 wherein said mass of helical windings comprises a plurality of milled sponges, wherein each milled sponge has a plurality of layers of at least one continuous helical winding extending in a generally spiral direction about a central axis of said milled sponge, and wherein each milled sponge is maintained in an axially compacted condition by engagement with said plurality of outwardly extending projections of said elongate electrical conductor.

7. An apparatus according to claim 1 wherein the radius of curvature of each of said helical windings is not more than about one quarter of an inch.

8. An apparatus according to claim 1 further comprising:
    a second tube surrounding and in spaced apart relation from said first dielectric tube thereby defining a passageway between the first and said second tubes for capturing ozone generated at the outer electrode; and
    endcap means connected to said first and second tubes for permitting the inflow of an oxygen containing gas into the passageway between the first and second tubes, for permitting the flow of gas from the passageway between the first and second tubes to the interior of said first dielectric tube, and for permitting the outflow of gas from the interior of said first dielectric tube.

9. An apparatus according to claim 1 wherein said first dielectric tube comprises borosilicate glass.

10. An apparatus according to claim 1 wherein said outer electrode has an open lattice structure.

11. An apparatus for generating ozone from an oxygen containing gas using an electrical corona, said apparatus comprising:
    a first dielectric tube;
    an outer electrode overlying a portion of said first dielectric tube;
    an inner electrode positioned in an interior of said first dielectric tube and underlying said outer electrode, said inner electrode being formed of a mass of helical windings of electrically conductive material substantially filling an interior cross-section of said first dielectric tube, said helical windings having a series of curved surfaces thereon for creating the electrical corona therefrom and being permeable to a flow of gas to thereby produce ozone from an oxygen containing gas passing through said helical windings; and
    an elongate electrical conductor positioned in the interior of said first dielectric tube and extending through said mass of helical windings, said elongate electrical conductor having a plurality of outwardly extending projections in electrical contact with adjacent portions of said mass of helical windings.

12. An apparatus according to claim 11 wherein said elongate electrical conductor comprises an electrically conductive strip, wherein said plurality of outwardly extending projections comprise opposing rows of sawtooth-shaped projections extending outwardly from opposing side edges of said strip.

13. An apparatus according to claim 12 wherein said strip has a generally sinuous longitudinal cross-section defined by a series of spaced apart alternating bends.

14. An apparatus according to claim 12 wherein said strip has enlarged opposite end portions for securing the mass of helical windings therebetween.

15. An apparatus according to claim 11 wherein said mass of helical windings comprises a plurality of milled sponges, wherein each milled sponge has a plurality of layers of at least one continuous helical winding extending in a generally spiral direction about a central axis of said milled sponge, and wherein each milled sponge is maintained in an axially compacted condition by engagement with said plurality of outwardly extending projections of said elongate electrical conductor.

16. An apparatus according to claim 11 wherein the radius of curvature of each of said helical windings is not more than about one quarter of an inch.

17. An apparatus according to claim 11 further comprising:
a second tube surrounding and in spaced apart relation from said first dielectric tube thereby defining a passageway between the first and said second tubes for capturing ozone generated at the outer electrode; and
endcap means connected to said first and second tubes for permitting the inflow of an oxygen containing gas into the passageway between the first and second tubes, for permitting the flow of gas from the passageway between the first and second tubes to the interior of said first dielectric tube, and for permitting the outflow of gas from the interior of said first dielectric tube.

18. An apparatus according to claim 11 wherein said first dielectric tube comprises borosilicate glass.

19. An apparatus according to claim 11 wherein said outer electrode has an open lattice structure.

20. An apparatus for generating ozone from an oxygen containing gas using an electrical corona, said apparatus comprising:
a housing;
a first dielectric tube positioned within said housing;
an outer electrode overlying a portion of said first dielectric tube;
an inner electrode positioned in an interior of said first dielectric tube and underlying said outer electrode for creating an electrical corona and thereby producing ozone from an oxygen containing gas passing through said inner electrode;
an elongate electrical conductor positioned in the interior of said first dielectric tube, said elongate electrical conductor having a plurality of outwardly extending projections in electrical contact with adjacent portions of said inner electrode;
a second tube surrounding and in spaced apart relation from said first dielectric tube thereby defining a passageway between the first and said second tubes for capturing ozone generated at the outer electrode; and
endcap means connected to said first and second tubes for permitting the inflow of an oxygen containing gas into the passageway between the first and second tubes, for permitting the flow of gas from the passageway between the first and second tubes to the interior of said first dielectric tube, and for permitting the outflow of gas from the interior of said first dielectric tube, said endcap means further comprising plunger means at one end of said first and second tubes for removably positioning said first and second tubes within said housing wherein said inner electrode is formed of a mass of helical windings of electrically conductive material, and wherein said helical windings have a series of curved surfaces thereon for creating the electrical corona therefrom.

21. An apparatus according to claim 21 wherein said elongate electrical conductor comprises an electrically conductive strip, and wherein said plurality of outwardly extending projections comprise opposing rows of sawtooth-shaped projections extending outwardly from opposing side edges of said strip.

22. An apparatus according to claim 21 wherein said strip has a generally sinuous longitudinal cross-section defined by a series of spaced apart alternating bends.

23. An apparatus according to claim 20 wherein said strip has enlarged opposite end portions for securing the mass of helical windings therebetween.

24. An apparatus according to claim 20 wherein said mass of helical windings substantially fills an interior cross-section of said first dielectric tube.

25. An apparatus according to claim 20 wherein said mass of helical windings comprises a plurality of milled sponges, wherein each milled sponge has a plurality of layers of at least one continuous helical winding extending in a generally spiral direction about a central axis of said milled sponge, and wherein each milled sponge is maintained in an axially compacted condition by engagement with said plurality of outwardly extending projections of said elongate electrical conductor.

26. An apparatus according to claim 20 wherein the radius of curvature of each of said helical windings is not more than about one quarter of an inch.

27. A method for making an ozone generator comprising the steps of:
providing a plurality of milled sponges, each having a plurality of layers of at least one continuous helical winding extending in a generally spiral direction about a central axis of the milled sponge;
providing an elongate electrical conductor having a plurality of outwardly extending projections thereon; and
successively positioning each of the plurality of milled sponges onto the elongate electrical conductor about the central axis of each sponge.

28. A method according to claim 27 wherein the step of successively positioning each milled sponge onto the elongate electrical conductor comprises positioning each with respect to adjacent projections so that each sponge is positioned having a predetermined degree of axial compaction.

29. A method according to claim 27 further comprising the steps of:
providing a dielectric tube; and
positioning the elongate electrical conductor carrying the plurality of milled sponges into an interior of the dielectric tube.

30. A method according to claim 29 further comprising the steps of providing an outer electrode and positioning the outer electrode overlying a portion of the dielectric tube.

31. A method according to claim 30 further comprising the steps of providing and positioning a second tube surrounding said the outer electrode for capturing ozone produced thereby.

32. A method according to claim 27 wherein the step of providing the elongate electrical conductor comprises providing a strip having opposing rows of sawtooth-shaped projections extending outwardly from opposing side edges of the strip, and wherein the strip has a generally sinuous longitudinal cross-section defined by a series of alternating bends.

* * * * *